United States Patent [19]

Jacobson

[11] 4,094,350
[45] June 13, 1978

[54] SCREW DRIVER

[76] Inventor: Ralph Spencer Jacobson, 27970 Le Dunne Ave., Aldergrove, B.C., Canada

[21] Appl. No.: 796,348

[22] Filed: May 12, 1977

Related U.S. Application Data

[62] Division of Ser. No. 680,715, Apr. 27, 1976, Pat. No. 4,033,244.

[51] Int. Cl.² .................................................. B25B 15/02
[52] U.S. Cl. .................................................. 145/50 D
[58] Field of Search ................ 145/50 D, 50 B, 50 R, 145/50 A, 50 DB; 85/45; 81/71; 248/305

[56] References Cited
U.S. PATENT DOCUMENTS

| 101,207 | 3/1870 | Angar | 85/45 |
| 748,241 | 12/1903 | Walter | 145/50 B |
| 1,365,508 | 1/1921 | Kucewicz | 85/45 |
| 2,287,457 | 6/1942 | Stowell | 145/50 B X |
| 2,518,886 | 8/1950 | Halvorsen | 81/71 |
| 3,215,177 | 11/1965 | Swenson | 145/50 DB |

FOREIGN PATENT DOCUMENTS

| 1,503,636 | 10/1967 | France | 248/305 |
| 206,759 | 2/1909 | Germany | 145/50 DB |

Primary Examiner—N. P. Godici
Attorney, Agent, or Firm—Carver and Company

[57] ABSTRACT

A screw and complementary screw driver for use in relatively inaccessible places where, with conventional tools, difficulty would be encountered in locating the screw on end of screw driver in axial alignment therewith. Screw driver has a generally V-shaped screw engaging means having a root portion extending from screw driver stem, and a transverse portion interconnecting root portion with an oblique portion, the oblique portion extending obliquely to transverse portion. Screw has bridge portion with clearance passage extending under bridge portion to accept the V-shaped means, passage having clearance at inner and outer ends for insertion and removal of screw driver. Stop member is threaded onto outer end of oblique portion to draw screw driver into axial alignment with screw and to maintain screw on end of screw driver for all inclinations of screw driver.

10 Claims, 7 Drawing Figures

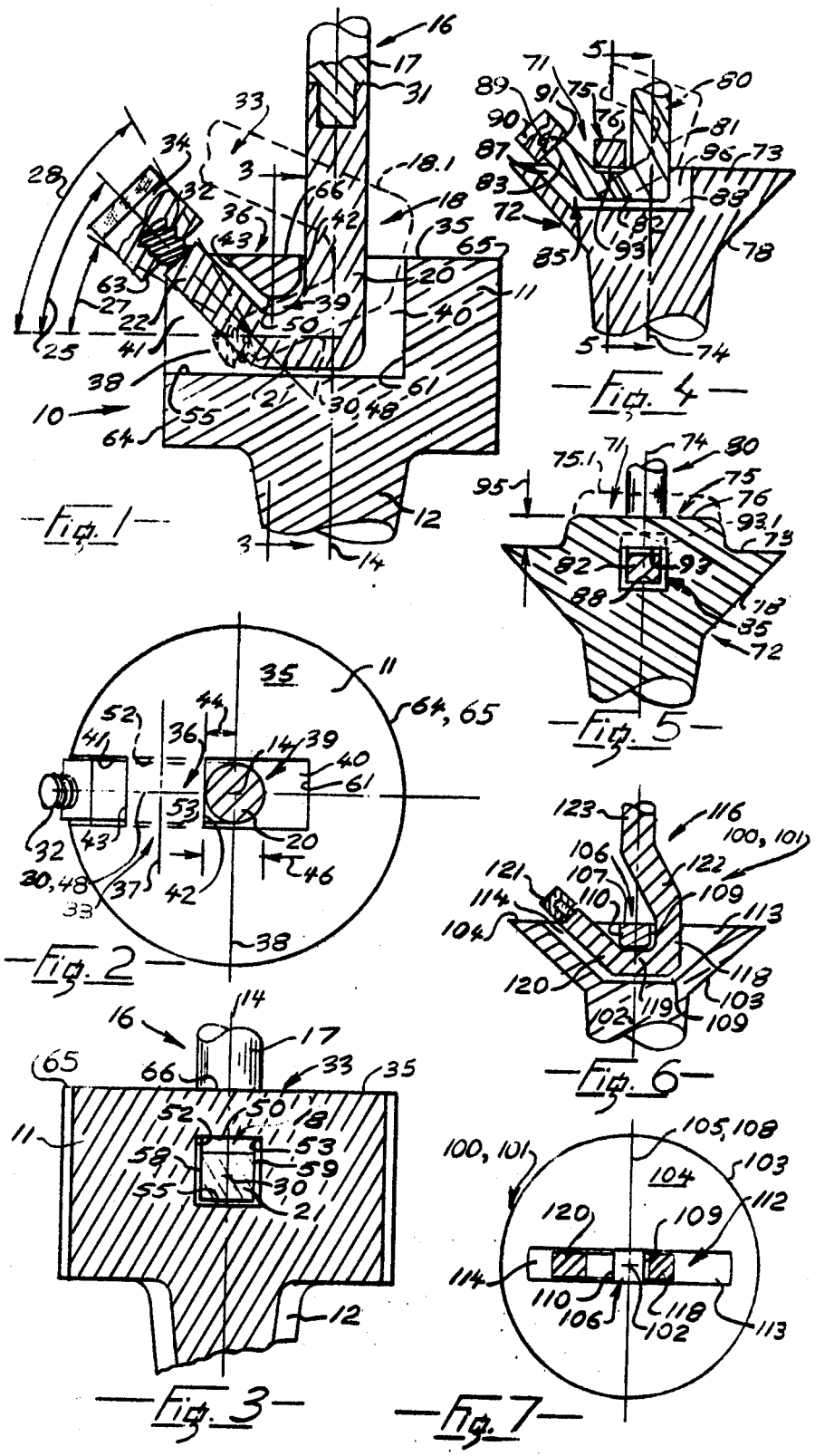

SCREW DRIVER

This is a division of application Ser. No. 680,715, filed Apr. 27, 1976, now U.S. Pat. No. 4,033,244.

BACKGROUND OF THE INVENTION

1. Field of the Invention

The invention relates to complementary engaging means of a screw and screw driver particularly adapted for use in awkward or relatively inaccessible locations where a common screw and screw driver would be inconvenient.

2. Prior Art

There is a long standing problem relating to applying torque to screws in awkward or relatively inaccessible places where the screw cannot be held temporarily by hand whilst being rotated prior to "biting" or engaging the opening into which it is being screwed. Heads of common screws are provided with engaging means to engage complementary screw driver bits, for example the slot head, Phillips or Robertson engaging means. However, none of these engaging means positively hold the screw on the screw driver so that the screw is maintained in axial alignment with the screw driver when the screw driver is held at any inclination to the horizontal. Furthermore, when torque is applied by the screw in some of the common engaging means, reaction forces are generated between the engaging means which tend to disengage the engaging means, thus causing the screw driver to slip relative to the screw.

SUMMARY OF THE INVENTION

The invention reduces the difficulties and disadvantages of the prior art by providing complementary engaging means of a screw and a screw driver in which the screw is held positively and releasably on the screw engaging means of the screw driver and in axial alignment therewith to permit complete control of the screw before and during engagement with the openings into which it is to be screwed, for all angular dispositions of the screw driver.

The screw engaging means of the invention extends from a shank of the screw driver and is generally V-shaped and includes a root portion, a transverse portion and an oblique portion. The root portion extends from the shank to join the transverse portion. The transverse portion interconnects the root and oblique portions, and the oblique portion extends obliquely from the transverse portion. The screw of the invention has a threaded body and screw head, the screw head having driver engaging means characterized by a bridge portion adjacent an outer portion of the screw head remote from the body. A clearance passage extends under the bridge portion to accept the V-shaped screw engaging means, the passage having clearance at either end thereof for insertion and removal of the V-shaped screw engaging means.

A detailed disclosure following, related to drawings, describes a preferred embodiment of the invention which is capable of expression in structure other than that particularly described and illustrated.

DESCRIPTION OF THE DRAWINGS

FIG. 1 is a simplified fragmented section of a first embodiment of a screw and screw driver according to the invention, shown mutually engaged, FIG. 2 is a simplified top plan view of the screw and screw driver of FIG. 1, a stop member being omitted, FIG. 3 is a simplified fragmented section on Line 3—3 of FIG. 1, FIG. 4 is a simplified fragmented section of a second embodiment of a screw and screw driver according to the invention, FIG. 5 is a simplified fragmented section on Line 5—5 of FIG. 4, FIG. 6 is a simplified section of a third embodiment of a screw and screw driver according to the invention, FIG. 7 is a simplified fragmented top plan of the screw and screw driver of FIG. 6, some portions being omitted.

DETAILED DISCLOSURE

FIGS. 1 through 3

A screw 10 according to the invention has a cylindrical screw head 11 and a threaded body 12 disposed on a central axis 14 of the screw. A screw driver 16 according to the invention has a shank 17 and a generally V-shaped screw engaging means 18 extending from an end of the shank. The screw engaging means has a root portion 20, a transverse portion 21 and an oblique portion 22. The root portion extends from the shank 17 and the transverse portion interconnects the root and oblique portions. The oblique portion extends obliquely from the transverse portion 21 so as to define the general V-shape of the screw engaging means. For convenience of definition, the oblique portion is considered to be bent or inclined at an acute angle 25 to the transverse portion. The angle 25 is typically 45°, but depending upon requirements the angle can be within a range defined by a relatively shallow angle 27, of about 30°, and a relatively steep angle 28 of about 60°. The transverse portion 21 is relatively short and has an axis 30 which is disposed generally normally to the axis 14 of the screw. Alternatively the angle of inclination of the oblique portion can be defined with reference to the screw driver shank, and thus can be within a similar range of inclination of between 30° and 60° to the shank.

The screw engaging means 18 can be a separable "bit" and be releasably connected to the screw driver shank 17 by a releasable connecting means 31 which forms no portion of the invention. The connecting means can be common complementary male and female portions of the shank and screw engaging "bit" which are retained in engagement by a spring means (not shown). The oblique portion 22 has a threaded outer end 32 and carrier a separable cylindrical stop member 34, (not shown in FIG. 2) the stop member having an internal thread means to permit threading onto the end 32 to retain the screw on the screw driver as will be described.

The screw head 11 has a driver engaging means 33 characterized by a bridge portion 36 adjacent an outer surface 35 of the screw head remote from the body. The bridge has a bridge axis 37 coincident with a chord of the screw head so as to be displaced from a diameter 38 of the screw head, and spaced opposed bridge inner and outer side walls 42 and 43. The wall 42 is parallel to and is displaced from the diameter 38 of the screw head by an amount 44 which is sufficient to permit the screw engaging means 18 to be retained in the driver engaging means 33 with the shank 17 of the screw driver aligned with the central axis 14 of the screw. It can be seen that the amount 44 is generally equal to one half of lateral width or diameter 46 of the root portion 20 which is adjacent the bridge portion when the screw driver engages the screw. The root portion is shown to be cylindrical at the plane of section but for increased strength changes to a square cross-section adjacent the transverse portion.

The means 33 includes a clearance passage 39 extending under the bridge portion to accept the screw engaging means 18 as shown in FIG. 1, the passage having inner and outer ends 40 and 41 respectively. The inner and outer ends 40 and 41 are spaced sufficiently from the bridge portion to provide clearance at either end of the passage sufficient for insertion and removal of the screw engaging means 18, which is shown in broken outline at 18.1 in a partially inserted position. Note that the stop member 34 is removed for such insertion or removal.

The clearance passage 39 has a central axis 48 disposed generally radially of the screw head and generally coincident with the axis 30 of the transverse portion 21. The passage 39 is further defined in part by an undersurface 50 of the bridge portion, a pair of spaced passage side walls 52 and 53, and a passage inner surface 55 disposed oppositely to the undersurface 50 of the bridge portion. The passage side wall 52 and 53 are spaced equally from the central axis 48 of the passage and are generally normal to the bridge axis 37. As best seen in FIG. 3, when the screw engaging means 18 engages the screw, opposite sides 58 and 59 of the transverse portion 21 are adjacent the passage side walls 52 and 53 respectively. The sides 58 and 59 are complementary to the side walls 52 and 53 respectively so that torque applied to the screw driver by an operator is transmitted from the screw engaging means 18 to the means of the screw head mainly through the passage side walls and the complementary opposite sides of the transverse portion. The oblique and root portions have similarly undesignated opposite sides, which similarly engage adjacent complementary portions of the passage to transmit torque to the screw.

The clearance at the inner end 40 of the passage is defined in part by a passage inner end wall 61 which is disposed on a side of the screw remote from the bridge portion so as to provide sufficient clearance for insertion of the oblique and transverse portions under the bridge as previously described and shown in broken outline at 18.1 in FIG. 1. The clearance at the outer end 41 of the passage is provided by the clearance passage extending to break through a cylindrical periphery 64 and rim 65 of the screw head. Thus the passage extends through an open side of the screw head and thus such a screw would not be used in a counterbored or countersunk hole as there would be insufficient clearance for the oblique portion to project from the screw. Alternative screws suitable for counter-sunk holes are shown in FIGS. 4 and 6. It is noted that an inner end face 63 of the stop member 34 bears against the rim 65 of the screw head. This is to maintain suitable engagement and alignment of the complementary engaging means during application of torque, and also to prevent the screw driver accidentally disengaging from the screw head.

The bridge portion 36 has an outer surface 66 that is generally flush with the outer surface 35 of the screw head, and the passage inner surface 55 is disposed inwardly of a surrounding portion of the outer surface 35. Thus the driver engaging means 33 in the screw head is essentially flush with the outer surface 35 of the screw head.

OPERATION

If the screw is to be inserted in a vertical wall or roof surface or in a relatively awkward location, the screw can be releasably secured on the end of the screw driver in axial alignment therewith by inserting the screw engaging means through the clearance passage 39 until the threaded outer end 32 projects above the outer surface 35 of the head. The stop member 34 is screwed onto the end 32 until the inner face 63 bears on the rim 65 and then further rotation of the member 34 draws the root portion 20 generally laterally against the bridge inner side wall 42 so as to maintain the shank 17 of the screw driver in alignment with the screw axis 14. The screw is then positively located on the screw driver and can be inserted at any inclination into the hole in the normal manner and the screw driver is then rotated to screw inwards into the hole. When the screw is sufficiently imbedded, the stop member 34 is unscrewed and the screw engaging means disengaged by reversing the above procedure.

If the space around the screw is restricted it is of advantage to separate the screw engaging means 18 from the screw driver shank at the releasable connection 31. This permits easy engagement with, or disengagement from, the screw without the need of excessive clearance around the screw that would otherwise be required if the bit were not separable from the shank. If the screw engaging menas is permanently secured to the shank of the screw driver, some considerable clearance is required around the screw to permit swinging of the screw driver about the screw through approximately 90° to permit insertion and engagement of the screw engaging means. Clearly for correct operation the screw engaging means is inserted only in the inner end of the clearance passage.

ALTERNATIVES AND EQUIVALENTS

FIGS. 4 and 5

An alternative screw head 72 has an outer surface 73 and an axis 74. The head has an alternative driver engaging means 71 having an alternative bridge portion 75 having an outer surface 76 disposed outwardly of the outer surface 73. The screw head has a truncated conical periphery 78 and thus is a counter-sunk head screw, which permits recessing of the head in a complementary counter-sunk hole. Alternative screw engaging means 80 of a screw driver (not shown) has similar root, transverse and oblique portions 81, 82 and 83 respectively and, whilst this screw engaging means is basically similar to the means 18 of FIG. 1, it is noted that the transverse portion is extended somewhat thus increasing area of contact between side walls of the transverse portion and the screw head.

A clearance passage 85 extends under the bridge portion 75 and has inner and outer ends 86 and 87 for insertion and removal of the screw engaging means 80, and an inner surface 88 disposed inwardly of the surrounding portion of the outer surface 76 of the screw. It is noted that the outer end 87 of the clearance passage is clear of the periphery 78 of the head and thus is suitable for use with the counter-sunk screw, because the oblique portion does not interfere with the side wall of the complementary hole into which the screw head fits. The screw engaging means has a threaded outer end 89 to accept a threaded stop member 90. The member 90 has an inner rim 91 which interferes with the upper surface 73 of the head when the stop member is screwed tightly onto the oblique portion 83 thus drawing the root portion 81 against the bridge 75.

The bridge portion 75 has an undersurface 93 generally level with the outer surface 73 of the screw. Thus it can be seen the bridge has a depth 95 projecting outwards from the surface 73. An alternative bridge portion 75.1, shown in broken outline in FIG. 5 only, projects further from the surface 73 and has an under surface 93.1 disposed outwardly of the surface 73, thus providing additional clearance for insertion of the engaging means.

In operation, the alternative complementary engaging means 71 and 80 function similarly to equivalent structure previously described with reference to FIGS. 1. through 3.

FIGS. 6 and 7

A second alternative counter-sunk screw head 101 has a screw axis 102 and a similar truncated conical periphery 103. The screw head has a generally flat outer surface 104 and an alternative driver engaging means 100 having a bridge portion 106 with an outer surface 107 generally flush with the surface 104. In contrast with the previously described screw head, the bridge has an axis 105 which coincides with a diameter 108 of the screw head, and has spaced opposed bridge inner and outer side walls 109 and 110 respectively spaced equally on opposite sides of the diameter as shown.

The means 100 has a clearance passage 112 in the screw head extending under the bridge portion to inner and outer ends 113 and 114 which are clear of the periphery 103. An alternative screw engaging means 116 has root, transverse and oblique portions 118, 119 and 120 respectively which are generally similar to equivalent portions of the previously described screw engaging means. The root portion extends from an inclined end portion 122 of a screw driver shank 123 to accommodate the diametrically disposed bridge portion 106 so that when the engaging means 100 and 116 are engaged, the screw driver shank 123 is aligned with the screw axis 102. The inclined end portion 122 thus displaces transversely from the shank the root portion, together with the transverse and oblique portions of the engaging means to ensure alignment when torque is applied to the screw. A threaded stop member 121 can be threaded onto the end of the oblique portion 120 and tightening of the stop member draws the root portion 118 against the inner side wall 109 of the bridge portion thus preventing disengagement and maintaining alignment as aforesaid.

It is seen that the alternative means 100 has a symmetrically disposed bridge portion and, with suitable design, the inner and outer ends 113 and 114 of the clearnace passage can be disposed symmetrically about the bridge portion 107 permitting insertion of the screw engaging means from either side of the bridge portion. Such an arrangement eliminates the difficulty of inserting the screw engaging means in the previously described embodiments which are assymmetrical and in which the oblique portion must clearly be inserted always from a side adjacent the inner bridge side wall. Clearly the screw drivers of FIGS. 1 and 4 cannot be used effectively with the screw head 101 of FIG. 6 and vice versa.

I claim:

1. A screw engaging means of a screw driver, the screw engaging means being adapted to extend from a shank of the screw driver and being generally V-shaped and including a root portion, a transverse portion and an oblique portion, the portions being characterized by:
   (a) the root portion extending from the screw driver shank to join the transverse portion,
   (b) the transverse portion interconnecting the root and oblique portions, the transverse portion having a size sufficient to pass through a clearance passage extending under a bridge portion of a screw,
   (c) the oblique portion extending obliquely from the transverse portion to an outer end of the oblique portion, the outer end having stop engaging means spaced from the transverse portion sufficiently to accept the screw retained on the transverse portion, and the screw engaging means further includes:
   (d) a separable stop member to engage releasably the stop engaging means at the outer end of the oblique portion to retain the screw on the screw driver.

2. A screw engaging means as claimed in claim 1 in which:
   (a) the stop engaging means at the outer end of the oblique portion includes a screw thread,
   (b) the stop member has internal screw thread means for screwing on to the threads at the outer end of the oblique portion.

3. A screw engaging means as claimed in claim 1 in which:
   (a) an inclined end portion extends from the screw driver shank,
   (b) the root portion extends from the inclined end portion so as to be displaced transversely from the shank.

4. A screw engaging means as claimed in claim 1 in which:
   (a) the root portion extends as an axial extension of the shank to join the transverse portion.

5. A screw engaging means as claimed in claim 1 which:
   (a) the oblique portion is inclined at an acute angle to the transverse portion of between about 30° and 60°.

6. A screw engaging means as claimed in claim 1 in which:
   (a) the oblique portion is inclined to the screw driver shank at an angle of inclination of between 30° and 60°.

7. A screw engaging means as claimed in claim 1 in which:
   (a) the transverse portion is relatively short and has an axis which is disposed generally normally to the axis of the screw.

8. A screw engaging means as claimed in claim 1 further including:
   (a) a releasable connecting means is fitted between the shank and the screw engaging means to releasably connect them together.

9. A screw engaging means as claimed in claim 2 in which:
   (a) the oblique portion is inclined at an acute angle to the transverse portion of between about 30° and 60°.

10. A screw engaging means as claimed in claim 2 in which:
    (a) the oblique portion is inclined to the screw driver shank at an angle of inclination of between 30° and 60°.

* * * * *